United States Patent
Jung et al.

(10) Patent No.: US 10,435,009 B2
(45) Date of Patent: Oct. 8, 2019

(54) APPARATUS AND METHOD OF EXTRACTING VIBRATION OF HYBRID ELECTRIC VEHICLE

(71) Applicant: HYUNDAI MOTOR COMPANY, Seoul (KR)

(72) Inventors: Tae Hee Jung, Seongnam-si (KR); Byunghoon Yang, Seongnam-si (KR)

(73) Assignee: Hyundai Motor Company, Seoul (KR)

( * ) Notice: Subject to any disclaimer, the term of this patent is extended or adjusted under 35 U.S.C. 154(b) by 181 days.

(21) Appl. No.: 15/598,804

(22) Filed: May 18, 2017

(65) Prior Publication Data

US 2018/0148039 A1    May 31, 2018

(30) Foreign Application Priority Data

Nov. 28, 2016 (KR) .................. 10-2016-0159579

(51) Int. Cl.
| | | |
|---|---|---|
| *B60W 20/15* | (2016.01) | |
| *B60W 30/20* | (2006.01) | |
| *B60K 6/48* | (2007.10) | |
| *B60K 6/485* | (2007.10) | |
| *B60K 6/26* | (2007.10) | |
| *B60W 50/00* | (2006.01) | |

(52) U.S. Cl.
CPC ............ *B60W 20/15* (2016.01); *B60K 6/48* (2013.01); *B60K 6/485* (2013.01); *B60W 30/20* (2013.01); *B60K 2006/268* (2013.01); *B60K 2006/4825* (2013.01); *B60W 2030/206* (2013.01); *B60W 2050/0052* (2013.01); *B60W 2050/0057* (2013.01); *B60W 2510/06* (2013.01); *B60W 2510/0638* (2013.01); *B60W 2510/0652* (2013.01); *B60W 2510/081* (2013.01); *B60W 2510/082* (2013.01); *Y02T 10/6221* (2013.01); *Y02T 10/6226* (2013.01); *Y02T 10/6252* (2013.01); *Y10S 903/93* (2013.01)

(58) Field of Classification Search
CPC ............ B60K 6/20; B60K 6/48; B60K 6/485; B60W 20/15
See application file for complete search history.

(56) References Cited

U.S. PATENT DOCUMENTS

| | | | | |
|---|---|---|---|---|
| 2004/0000281 A1* | 1/2004 | Wakitani | ............. | F02N 11/0848 123/179.3 |
| 2014/0107877 A1* | 4/2014 | Bang | ....................... | B60L 11/14 701/22 |
| 2016/0297448 A1* | 10/2016 | Ito | ......................... | B60W 30/20 |

* cited by examiner

*Primary Examiner* — Anne M Antonucci
*Assistant Examiner* — Renee LaRose
(74) *Attorney, Agent, or Firm* — Brinks Gilson & Lione

(57) ABSTRACT

The present disclosure relates to an apparatus for extracting vibration of a hybrid vehicle, and more particularly, to an apparatus and a method of extracting vibration of a hybrid vehicle by varying a target vibration frequency. An apparatus for extracting vibration of a hybrid electric vehicle includes: an engine and a driving motor, which are power sources; a starter motor/generator connected to the engine; and a control unit configured to measure a motor speed of the starter motor/generator, to generate a speed variation quantity based on the motor speed of the starter motor/generator, to calculate a vibration frequency of the engine when the speed variation quantity exceeds a reference value, to set a filter band based on the vibration frequency of the engine, and to extract, with the filter band, a vibration of the engine.

9 Claims, 4 Drawing Sheets

APPARATUS AND METHOD OF EXTRACTING VIBRATION OF HYBRID ELECTRIC VEHICLE

CROSS-REFERENCE TO RELATED APPLICATION

The present application claims priority to and the benefit of Korean Patent Application No. 10-2016-0159579, filed on Nov. 28, 2016, which is incorporated herein by reference in its entirety.

FIELD

The present disclosure relates to an apparatus for extracting vibration of a hybrid electric vehicle, and more particularly, to an apparatus and a method of extracting vibration of a hybrid electric vehicle by varying a target vibration frequency.

BACKGROUND

The statements in this section merely provide background information related to the present disclosure and may not constitute prior art.

As continuous demand for an improvement of fuel efficiency of a vehicle as well as strict regulations on exhaust gas of each country increases desire for an environmentally-friendly vehicle. As a realistic alternative, a hybrid electric vehicle (HEV) is proposed.

The HEV is one classification of an electric vehicle including a pure electric vehicle (EV), which uses an electric motor as power, and a fuel cell electric vehicle (FCEV), and is distinguished from other electric vehicles in that the HEV receives power from two or more kinds of power sources including a driving motor and an engine. In the present disclosure, the HEV means a vehicle driven by two or more power sources including the driving motor and the engine, and includes a plug-in hybrid electric vehicle (PHEV) in a broad sense.

In the HEV, an engine clutch is mounted between the engine and the driving motor in order to transmit power of the engine to a driving shaft. The HEV provides an operation in an EV mode, in which the HEV travels only with a driving motor torque, and a HEV mode, in which the HEV travels with a sum of an engine torque and a driving motor torque, according to a connection of the engine clutch.

A transmission mounted electric device (TMED) scheme and a flywheel mounted electric device (FMED) scheme, in which an automatic transmission (AT) or a dual clutch transmission (DCT) is mounted, may be applied to the HEV.

The HEV in the TMED scheme includes two motors, and a speed of a motor connected with an engine is measured, and then vibration of the engine is extracted.

In the related art, when a vibrational component of the engine is extracted, a filter of a target frequency single band desired to be decreased is used. However, concerning the characteristic of a filter response, when an engine vibration frequency is changed based on a change in an engine speed, a size and a phase of the extracted vibrational component may be changed. Due to this, there is a limitation when attempting to decrease vibration.

SUMMARY

The present disclosure provides an apparatus and a method of extracting vibration of a hybrid electric vehicle, which are capable of extracting a vibrational component generated by a combustion pressure of an engine through a motor connected with the engine.

The present disclosure also provides an apparatus and a method of extracting vibration of a hybrid electric vehicle, which are capable of extracting vibration of an engine by varying a target vibration frequency.

Some forms of the present disclosure provide an apparatus for extracting vibration of a hybrid electric vehicle, the apparatus including: an engine and a driving motor, which are power sources; a starter motor/generator connected with the engine; and a control unit, which measures a motor speed of the starter motor/generator, generates a speed variation quantity by using the motor speed, calculates a vibration frequency of the engine when the speed variation quantity exceeds a reference value, sets a filter band according to the vibration frequency of the engine, and extracts vibration of the engine through the filter band.

The control unit may calculate the vibration frequency of the engine based on a rotational speed of the engine and the number of times of explosion per revolution of the engine.

The control unit may calculate the vibration frequency of the engine through Equation 1 below.

$$F = R \times (E/N), \qquad \text{[Equation 1]}$$

where F may be a vibration frequency of the engine, R may be a rotational speed of the engine, E may be the number of times of explosion per revolution of the engine, and N may be a conversion constant.

The apparatus may further include a motor state detector including: a motor speed detector, which detects a rotational speed of the starter motor/generator; or a motor position detector, which detects a position of the starter motor/generator.

The control unit may receive a motor position of the starter motor/generator from the motor position detector, and measure a motor speed based on the motor position.

Another form of the present disclosure provides a method of extracting vibration of a hybrid electric vehicle, the method including: measuring a motor speed of a starter motor/generator connected with an engine; generating a speed variation quantity by using the motor speed; determining whether the speed variation quantity exceeds a reference value; calculating a vibration frequency of the engine when the speed variation quantity exceeds the reference value; setting a filter band according to the vibration frequency of the engine; and extracting vibration of the engine through the filter band.

Another form of the present disclosure provides a method of extracting vibration of a hybrid electric vehicle, the method including: calculating a vibration frequency of an engine when a speed variation quantity of the engine exceeds an reference value; setting a filter band based on the vibration frequency of the engine; and extracting, with the filter band, a vibration of the engine. The speed variation quantity of the engine may be determined based on the engine speed or a motor speed of a starter motor/generator connected to the engine.

In some forms of the present disclosure, it is possible to effectively decrease vibration generated in the engine by extracting a vibrational component generated by a combustion pressure of the engine through the motor connected with the engine.

Further, vibration of the engine is extracted by varying a target vibration frequency, so that it is possible to extract vibration at various engine operation points.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
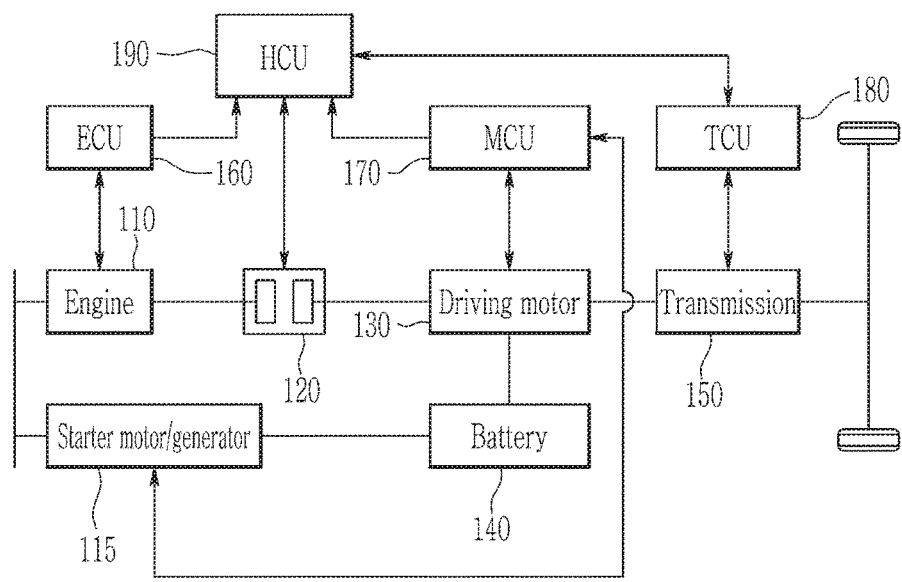
FIG. 1 is a diagram illustrating a hybrid electric vehicle, to which a vibration extracting apparatus is applied.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

FIG. 1 is a diagram illustrating a hybrid electric vehicle, to which a vibration extracting apparatus is applied, according to some forms of the present disclosure.

Referring to FIG. 1, a hybrid electric vehicle, to which a vibration extracting apparatus according to the present disclosure is applied, includes an engine 110, a starter motor/generator (or a hybrid starter & generator) 115, an engine clutch 120, a driving motor 130, a battery 140, a transmission 150, an engine control unit (hereinafter, referred to as an "ECU") 160, a motor control unit (hereinafter, referred to as an "MCU") 170, a transmission control unit (hereinafter, referred to as a "TCU") 180, and a hybrid control unit (hereinafter, referred to as an "HCU") 190.

The engine 110 combusts fuel and generates power. That is, as the engine 110, various publicly known engines, such as an existing gasoline engine or existing diesel engine using fossil fuel, may be used. Rotation power generated in the engine 110 is transferred to the transmission 150.

The starter motor/generator 115 starts the engine 110, or is operated as a generator in the state where the engine 110 is started, to generate electric energy.

The engine clutch 120 is disposed between the engine 110 and the driving motor 130, and is operated under a control of the HCU 190 and controls the power transference between the engine 110 and the driving motor 130. That is, the engine clutch 120 connects or blocks power between the engine 110 and the driving motor 130 depending on a switch of an electric vehicle (EV) mode and a hybrid electric vehicle (HEV) mode.

The driving motor 130 is operated by a three-phase alternating-current voltage applied from the battery 140 through an inverter and generates a torque. The driving motor 130 is operated as a generator during cruise driving or regenerative braking and supplies regenerative energy to the battery 140.

The battery 140 is formed of a plurality of unit cells, and stores a high voltage for providing a driving voltage to the driving motor 130. The battery 140 supplies a driving voltage to the driving motor 130 in the EV mode or the HEV mode, and is charged with a voltage generated by the driving motor 130 during the regenerative braking.

The transmission 150 receives a sum of an output torque of the engine 110 and an output torque of the driving motor 130 determined based on a connection and a disconnection of the engine clutch 120 as an input torque, and outputs driving force to driving wheels based on a selection of a predetermined gear stage depending on a vehicle speed and an operation condition to maintain travelling.

The ECU 160 is connected with the HCU 190 through a network, and is linked with the HCU 190 and controls a general operation of the engine 110 depending on an engine operation state, such as a demanded torque signal of a driver, a cooling water temperature, an engine rotational speed, a throttle valve opening rate, an air intake quantity, an oxygen quantity, and an engine torque. The ECU 160 provides an operation state of the engine 110 to the HCU 190.

The MCU 170 controls driving and a torque of the driving motor 130 under the control of the HCU 190, and stores a voltage generated by the driving motor 130 during the regenerative braking in the battery 140. The MCU 170 controls a general operation of the motor based on a demanded torque signal of the driver, a travelling mode of the vehicle, and a state of charge (SOC) of the battery 140.

The TCU 180 controls a general operation of the transmission 150, such as controlling a transmission ratio based on an output torque of each of the ECU 160 and the MCU 170, and determining a regenerative braking quantity. The TCU 180 provides an operation state of the transmission 150 to the HCU 190.

The HCU 200 is a top-level control unit controlling setting of a hybrid travelling mode and a general operation of the vehicle. The HCU 200 comprehensively controls subordinate control units connected through the network. For example, the HCU 200 may be connected with subordinate control units through a control unit area network (CAN) communication network. The HCU 200 collects and analyzes information about each subordinate control unit, executes a cooperative control, and controls output torques of the engine 110 and the driving motor 130.

The general operation of the environmentally-friendly HEV described in the present disclosure including the aforementioned function is identically or similarly executed to that of the HEV in the related art, so that a detailed description thereof will be omitted.

Figure 2:
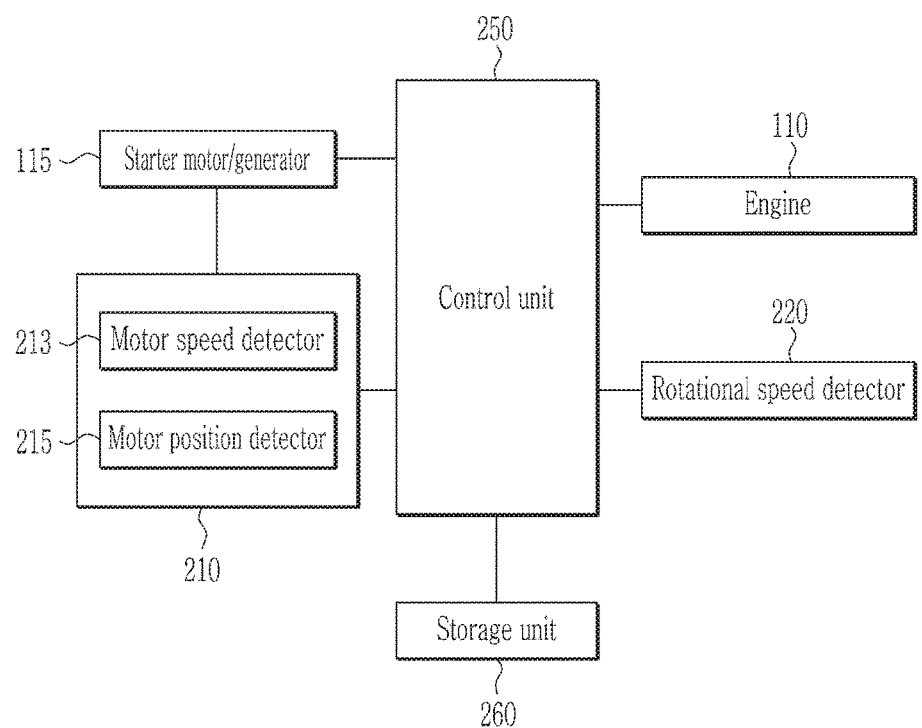
FIG. 2 is a diagram schematically illustrating the vibration extracting apparatus.

FIG. 2 is a diagram schematically illustrating the vibration extracting apparatus according to some forms of the present disclosure. Some processes of a vibration extracting method may be executed by the ECU 160, and other processes may be executed by the HCU 190. Accordingly, in some forms of the present disclosure, the present disclosure may be described based on one control unit 250 including the ECU 160, the MCU 170, and the HCU 190, so that for convenience of the description, the ECU 160, the MCU 170, and the HCU 190 will be referred to as the control unit 250 unless otherwise noted in the present specification and the claims.

Referring to FIG. 2, the vibration extracting apparatus of the HEV includes the engine 110, the starter motor/generator 115, a motor state detector 210, a rotational speed detector 220, the control unit 250, and a storage unit 260.

The engine 110 combusts fuel and generates power under the control of the control unit 250.

The starter motor/generator 115 may start the engine 110 or generate power by an output of the engine 110.

The motor state detector 210 includes at least one of a motor speed detector 213 and a motor position detector 215 for measuring a motor speed.

The motor speed detector 213 detects a rotating motor speed of the starter motor/generator 115. The motor speed detector 213 provides the detected motor speed to the control unit 250.

The motor position detector 215 detects a motor position of the starter motor/generator 115. In this case, the motor position may represent a rotation angle of a rotor of the starter motor/generator 115. For example, the motor position detector 215 may be a resolver.

The motor position detector 215 provides the detected motor position to the control unit 250.

The rotational speed detector 220 detects a rotational speed of the engine 110, and provides the detected rotational speed of the engine 110 to the control unit 250. In this case, the rotational speed may be expressed with revolutions per minute (RPM).

The control unit 250 controls the engine 110, the starter motor/generator 115, the motor state detector 210, the rotational speed detector 220, and the storage unit 260 which are the constituent elements of the vibration extracting apparatus.

That is, the control unit 250 measures a motor speed based on the data detected by the motor state detector 210, and generates a speed variation quantity by using the motor speed.

When the speed variation quantity exceeds a reference value, the control unit 250 calculates a vibration frequency of the engine 110, and sets a filter band according to the vibration frequency of the engine 110. The control unit 250 extracts vibration of the engine 110 through the filter band.

To this end, the control unit 250 may be implemented by one or more processors operated by a set program, and the set program is programmed so as to perform each step of the vibration extracting method according to some forms of the present disclosure. The vibration extracting method will be described in more detail with reference to FIGS. 3 and 4.

The storage unit 260 stores data required by the constituent elements of the vibration extracting apparatus and data generated by the constituent elements of the vibration extracting apparatus. For example, the storage unit 260 may store the motor speed or the motor position detected by the motor state detector 210, and store the engine rotational speed detected by the rotational speed detector 220. Further, the storage unit 260 may store the vibration frequency of the engine 110 calculated by the control unit 250, and store the motor speed measured by the control unit 250.

The storage unit 260 stores various programs for controlling the general operation of the vibration extracting apparatus.

The storage unit 260 may provide required data per requests of the motor state detector 210, the rotational speed detector 220, and the control unit 250.

The storage unit 260 may be formed of a combined memory, or may also be formed with a plurality of subdivided memories. For example, the storage unit 260 may be formed of a read only memory (ROM), a random access memory (RAM), a flash memory, and the like.

Hereinafter, a method of extracting vibration of a hybrid electric vehicle will be described with reference to FIGS. 3 and 4.

Figure 3:
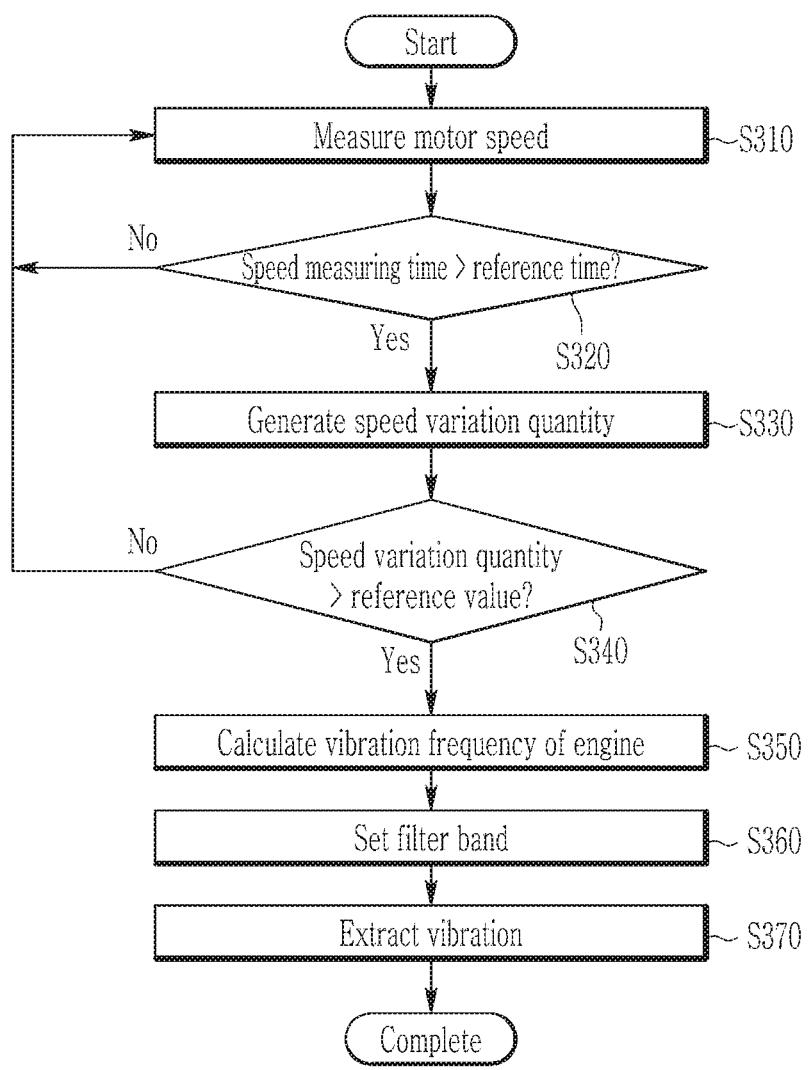
FIG. 3 is a flowchart illustrating a method of extracting vibration of a hybrid electric vehicle.

FIG. 3 is a flowchart illustrating a method of extracting vibration of a hybrid electric vehicle according to some forms of the present disclosure.

Referring to FIG. 3, the control unit 250 measures a motor speed of the starter motor/generator 115 connected with the engine 110 (S310). That is, the control unit 250 receives a motor position from the motor position detector 215 of the motor state detector 210. The control unit 250 measures a motor speed based on the received motor position. That is, the control unit 250 may differentiate the motor position and measure a motor speed.

Further, the control unit 250 may also receive a motor speed from the motor speed detector 213 of the motor state detector 210, and calculate a motor speed of the starter motor/generator 115 based on the received motor speed.

The control unit 250 determines whether a speed measuring time is equal to or elapses a reference time (S320). That is, the control unit 250 determines whether a speed measuring time, that is a measuring time of the motor speed, is equal to or elapses a reference time. Here, the reference time represents a time serving as a reference for determining a time converging a filter, and may be a predetermined time. The reference time may be set through a pre-designated algorithm (for example, a program and probability model).

In the meantime, when the speed measuring time does not elapse the reference time, the control unit 250 returns to operation S310 and measures a motor speed.

When the speed measuring time is equal to or elapses the reference time, the control unit 250 generates a speed variation quantity (S330). That is, when the speed measuring time is equal to or elapses the reference time, the control unit 250 generates a speed variation quantity based on the motor speed. That is, the control unit 250 may generate a speed variation quantity for a difference between a motor speed before the generation of the speed variation quantity and the motor speed measured in operation S310.

The control unit 250 determines whether the speed variation quantity exceeds a reference value (S340). Here, the reference value is a value serving as a reference for determining whether to change a filter based on the speed variation quantity, and may be a predetermined value. The reference value may be set through a pre-designated algorithm (for example, a program and probability model).

In the meantime, when the speed variation quantity is equal to or less than the reference value, the control unit 250 returns to operation S310 and measures a motor speed.

When the speed variation quantity exceeds the reference value, the control unit 250 calculates a vibration frequency of the engine 110 (S350). That is, the control unit 250 receives a rotational speed of the engine 110 from the rotational speed detector 220. The control unit 250 calculates a vibration frequency of the engine 110 by using the rotational speed, that is, the number of times of explosion per revolution of the engine 110. That is, the control unit 250 calculates a variation frequency of the engine 110 through Equation 1.

$$F = R \times (E/N), \qquad \text{[Equation 1]}$$

wherein, F may be a vibration frequency of the engine 110, R may be a rotational speed of the engine 110, E may be the number of times of explosion per revolution of the engine 110, and N may be a conversion constant. The conversion constant is a constant for converting a rotational speed into a frequency, and may be, for example, 60.

For example, when the engine 110 is a 4-cylinder engine, and the engine rotational speed is 1,400 rpm, the control unit 250 may substitute the engine rotational speed to Equation 1 and calculate a vibration frequency of the engine 110 as 46 HZ.

The control unit 250 sets a band filter based on the vibration frequency of the engine 110 (S360). When the vibration frequency of the engine 110 is changed, a size and a phase of the frequency are changed, the control unit 250 sets a band filter, through which the vibration frequency of the engine 110 may pass.

For example, the control unit 250 may change a band filter from that of FIG. 4A to that of FIG. 4B. In FIG. 4A, a first frequency pass band may be represented as denoted with reference numeral 410, and in FIG. 4B, a second frequency pass band may be represented as denoted with reference numeral 420. Accordingly, the second frequency pass band 420 is larger than the first frequency pass band 410. Also, the frequency pass band is changed, so that the size and the phase of the frequency are also changed.

Figure 4:
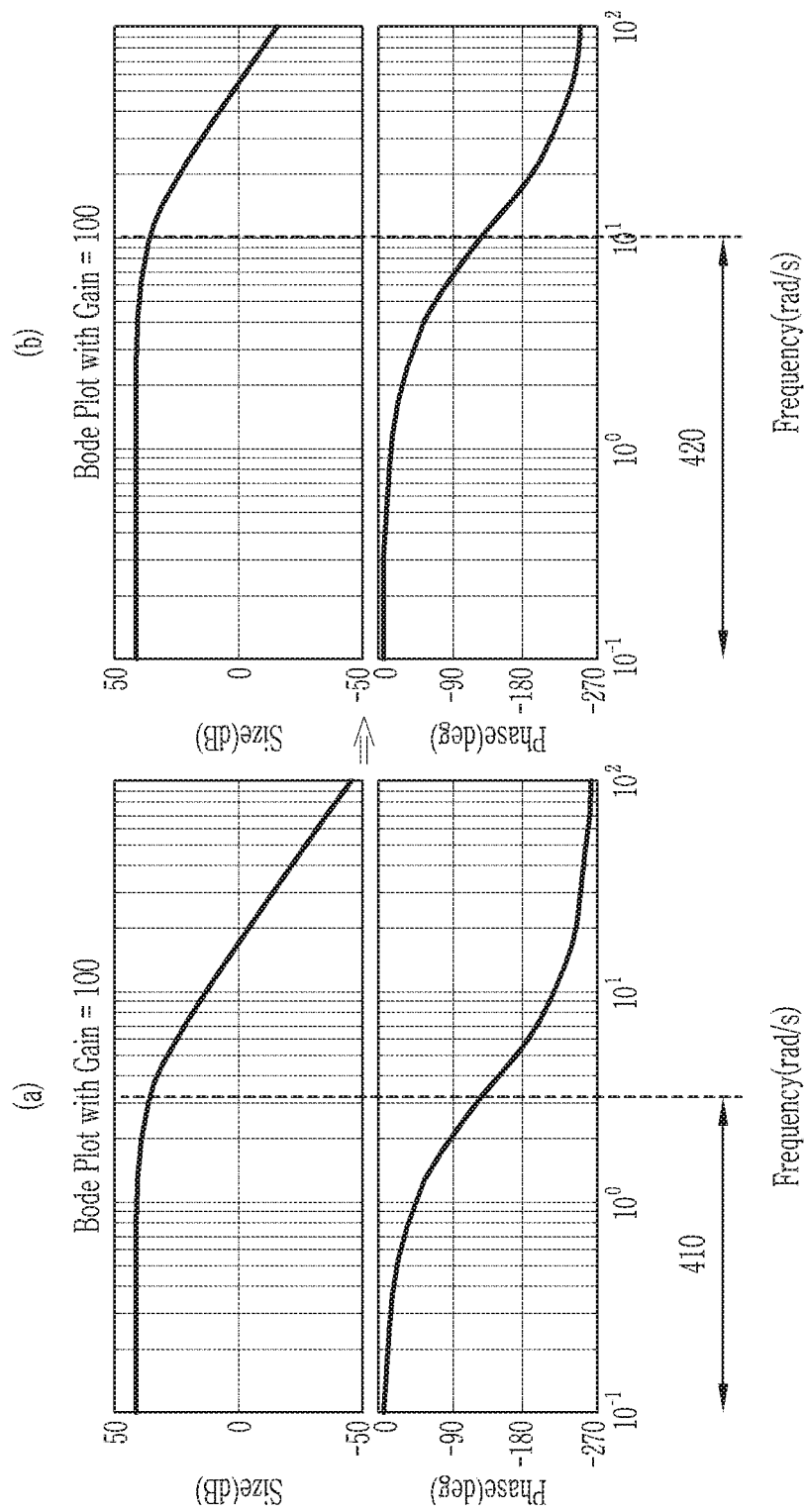
FIG. 4 is a diagram describing the method of extracting vibration of the hybrid electric vehicle.

The graph illustrated in FIG. 4 represents a low pass filter bode plot.

The control unit 250 extracts vibration of the engine 110 through the band filter (S370). That is, the control unit 250 extracts vibration of the engine 110 through the band filter set based on the vibration frequency of the engine 110.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. An apparatus for extracting vibration of a hybrid electric vehicle, the apparatus comprising:
an engine and a driving motor, wherein the engine and the driving motor are power sources;
a starter motor/generator connected to the engine; and
a control unit configured to:
measure a motor speed of the starter motor/generator;
generate a speed variation quantity based on the motor speed of the starter motor/generator;
when the speed variation quantity exceeds a reference value, calculate a vibration frequency of the engine;
set a filter band based on the vibration frequency of the engine;
extract, with the filter band, a vibration of the engine; and
calculate the vibration frequency of the engine based on a rotational speed of the engine and a number of times of explosion per revolution of the engine.

2. The apparatus of claim 1, wherein:
the control unit is configured to calculate the vibration frequency of the engine based on $F=R\times(E/N)$, wherein F is the vibration frequency of the engine, R is the rotational speed of the engine, E is the number of times of explosion per revolution of the engine, and N is a conversion constant.

3. The apparatus of claim 1, further comprising:
a motor state detector comprising either a motor speed detector or a motor position detector, wherein the motor speed detector is configured to detect a rotational speed of the starter motor/generator, and the motor position detector is configured to detect a position of the starter motor/generator.

4. The apparatus of claim 3, wherein:
the control unit is configured to receive a motor position of the starter motor/generator from the motor position detector, and to measure a motor speed based on the motor position.

5. A method of extracting vibration of a hybrid electric vehicle, the method comprising:
measuring a motor speed of a starter motor/generator connected to an engine;
generating a speed variation quantity based on the motor speed of the starter motor/generator;
determining whether the speed variation quantity exceeds a reference value;
when the speed variation quantity exceeds the reference value, calculating a vibration frequency of the engine;
setting a filter band based on the vibration frequency of the engine; and
extracting, with the filter band, a vibration of the engine,
wherein calculating the vibration frequency of the engine further comprises:
calculating the vibration frequency of the engine based on a rotational speed of the engine and a number of times of explosion per revolution of the engine.

6. The method of claim 5, wherein the vibration frequency of the engine is calculated based on $F=R\times(E/N)$, wherein F is the vibration frequency of the engine, R is the rotational speed of the engine, E is the number of times of explosion per revolution of the engine, and N is a conversion constant.

7. The method of claim 5, wherein generating the speed variation quantity further comprises:
determining whether a speed measuring time exceeds a reference time; and
when the speed measuring time exceeds the reference time, generating the speed variation quantity based on the motor speed of the starter motor/generator.

8. The method of claim 5, wherein measuring the motor speed further comprises:
measuring the motor speed of the starter motor/generator based on a motor position of the starter motor/generator.

9. A method of extracting vibration of a hybrid electric vehicle, the method comprising:
calculating a vibration frequency of an engine when a speed variation quantity of the engine exceeds an reference value;
setting a filter band based on the vibration frequency of the engine; and
extracting, with the filter band, a vibration of the engine,
wherein the speed variation quantity of the engine is determined based on the engine speed or a motor speed of a starter motor/generator connected to the engine, and
wherein calculating the vibration frequency of the engine further comprises:
calculating the vibration frequency of the engine based on a rotational speed of the engine and a number of times of explosion per revolution of the engine.

* * * * *